United States Patent [19]

Schiefer

[11] 4,156,381
[45] May 29, 1979

[54] EXPANSION DOWEL

[75] Inventor: Erwin Schiefer, Munich, Fed. Rep. of Germany

[73] Assignee: Hilti Aktiengesellschaft, Schaan, Liechtenstein

[21] Appl. No.: 824,737

[22] Filed: Aug. 15, 1977

[30] Foreign Application Priority Data

Aug. 19, 1976 [DE] Fed. Rep. of Germany ....... 2637350

[51] Int. Cl.² ............................................. F16B 13/08
[52] U.S. Cl. ........................................... 85/72; 85/79
[58] Field of Search ................... 85/23, 26, 66, 67, 72, 85/79, 81

[56] References Cited

U.S. PATENT DOCUMENTS

| 444,524 | 1/1891 | Gallagher | 85/23 UX |
| 922,980 | 5/1909 | Vernon et al. | 85/79 |
| 1,225,589 | 5/1917 | Cutting | 85/23 |
| 2,222,338 | 11/1940 | Roberts | 85/23 |
| 2,287,395 | 6/1942 | Reynolds | 85/79 X |
| 2,349,075 | 5/1944 | Cole | 85/72 |
| 2,474,281 | 6/1949 | Ruiz | 85/26 |
| 3,312,138 | 4/1967 | Cumming | 85/66 |
| 3,427,919 | 2/1969 | Lerich | 85/79 |
| 3,802,311 | 4/1974 | Ziegler | 85/79 |

FOREIGN PATENT DOCUMENTS

| 933382 | 9/1955 | Fed. Rep. of Germany | 85/79 |
| 1190731 | 5/1970 | United Kingdom | 85/79 |
| 1321479 | 6/1973 | United Kingdom | 85/79 |

Primary Examiner—Thomas J. Holko
Attorney, Agent, or Firm—Toren, McGeady and Stanger

[57] ABSTRACT

An expansion dowel of the type anchored within a prepared borehole, consists of a dowel body, an expansion element and a separating member. The expansion element is defined by a pair of slots cut in the dowel body. The slots do not intersect leaving a web connecting the expansion element to the dowel body. When the dowel is inserted into the borehole, the separating member breaks the web freeing the expansion element. The expansion element is wedge-shaped as is the recess in the dowel body defined by the slots.

11 Claims, 6 Drawing Figures

EXPANSION DOWEL

SUMMARY OF THE INVENTION

The invention is directed to an expansion dowel of the type inserted into a prepared borehole in a receiving material with the dowel consisting of a dowel body, a wedge-shaped expansion element, and a separating member. Means are provided on the trailing end of the dowel body, that is the end extending outwardly from a borehole, for producing axially directed forces. In particular, the invention concerns a recess formed in the side surface of the dowel body having a shape corresponding to the wedge-shape of the expansion element with the expansion element positioned within the recess and secured by a web to the dowel body.

In known expansion dowels of the general type mentioned above, the wedge-shaped expansion element is always a separate part of the dowel assembly. Initially, such an arrangement results in high manufacturing costs, since the wedge-shaped expansion element represents a rather complicated workpiece. Moreover, such expansion dowels have considerable drawbacks in assembly. To avoid loss of the expansion element during shipping and handling of the dowel assembly, it must be connected to the dowel body by special and elaborate measures, such as adhesive tape, retaining rings and the like. If such retaining elements are present in the borehole, there is in most cases a reduction in the anchoring value of the dowel, since the retaining elements lead to reduction of the friction between the outer surface of the dowel and the surface of the borehole. Additional costs are incurred in the packing operation for such dowels.

Therefore, the primary object of the present invention is to provide an expansion dowel which is easy to manufacture and which does not require any additional retaining elements that would reduce the anchoring values obtained by the dowel.

In accordance with the present invention, the wedge-shaped expansion element is formed from and is connected to the dowel body by a web having a predetermined breaking point. Further, a separating member for breaking the web when the dowel is inserted into a borehole is positioned between a wedge-shaped surface on the expansion element and the dowel body. Accordingly, the wedge-shaped expansion element forms a part of the dowel body until the dowel is inserted into a borehole. The manufacture of the expansion dowel is especially simple and merely requires two slots cut into the outer side surface of the dowel body. The web interconnecting the expansion element to the dowel body can be made sufficiently thick so that accidental separation of the expansion element from the body outside of a borehole is prevented.

To facilitate the separation of the expansion element from the dowel body, it is advantageous if the web is located at the end of the wedge surface of the element spaced from its web-shaped tip. Separation can be effected when the expansion dowel is driven into a borehole by the penetration into the slot between the expansion element and the dowel body by material remaining in the borehole after its formation. The dimension of the web or the predetermined breaking point can be varied in accordance with the extent to which the slotted cuts are formed in the dowel body in defining the wedge-shape of the expansion element.

For a simple assembly of the expansion element it is advantageous if the separating member is plate-shaped. By providing a thickness of the plate-shaped separating member corresponding to the thickness of the slotted cut used in forming the expansion element, no additional holding means are required for securing the separating member in the dowel assembly.

For breaking the web which forms the predetermined breaking point, it is advantageous if the separating member affords projections extending laterally outwardly from the side surface of the dowel body. When the dowel assembly is inserted into a borehole, the projections contact the surface of the borehole and as the dowel is driven into the borehole, resistance to the driving produces a force on the plate-shaped separating member which acts on the web in the direction opposite to the driving direction. Accordingly, the separating member exerts a force on the web which eventually is sufficient to rupture the predetermined breaking point separating the expansion element from the dowel body. If the dowel body is stressed in the direction opposite to the driving direction, the expansion element can be displaced axially relative to the dowel body with the dowel being wedged in the borehole. As the load is increased in pulling the dowel body outwardly from the borehole, the wedging action increases and, as a practical matter, the dowel cannot be pulled out of the borehole as long as the expanding forces do not exceed the compressive strength of the receiving material in which the borehole is formed.

To avoid any unnecessary interference in driving the dowel into a borehole, which might cause premature separation of the expansion element, it is advantageous if the projections provided by the separating member extending laterally from the side surfaces of the dowel body, increase in the direction toward the trailing end of the body. In this form, the projections afford barbs of sorts. Another function of such projections is the prevention of turning of the dowel body in the borehole. This feature is particularly important in dowels which are stressed or pulled outwardly from the borehole by means of a member screwed onto a thread on the trailing end of the dowel.

To prevent premature separation of the expansion element when the dowel is inserted into a borehole in a receiving material having hollow spaces between the receiving material surface and the end of the borehole, it is advantageous if the separating member extends forwardly of the leading end of the dowel body. With such an arrangement, the separation of the expansion element only takes place when the end of the separating member positioned forwardly of the leading end of the dowel body contacts the end or base of the borehole. Once such contact occurs, additional blows on the trailing end of the dowel body effect the separation of the predetermined breaking point provided by the web.

If an immediate wedging action is desired, even if there is considerable diameter differences between the dowel body and the borehole, it is advantageous if the separating element is designed as a prestressed spring. After the destruction of the web, the expansion element is pressed radially outwardly against the surface of the borehole. The initial stress of the separating member acting on the expansion element should be limited so that it does not cause deformation of the predetermined breaking point afforded by the web which would interfere with the introduction of the expansion dowel into a borehole or at least make it more difficult. In addition to the use of solid dowel bodies, it is also possible to use tubular dowel bodies, particularly where a female thread is required at the trailing end of the dowel. To prevent borings within the borehole and other material from entering the continuous bore through the dowel and entering the range of the female thread, it is desirable if the separating member has a transversely extending portion covering the leading end face of the dowel body. In such an arrangement the separating element forms a closure across the leading end of the dowel body.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
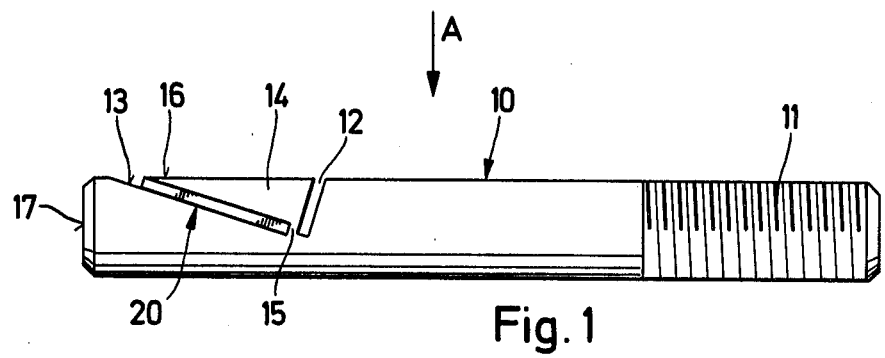
FIG. 1 is a side view of an expansion dowel in the form of a threaded stud and incorporating the present invention.
Figure 3:
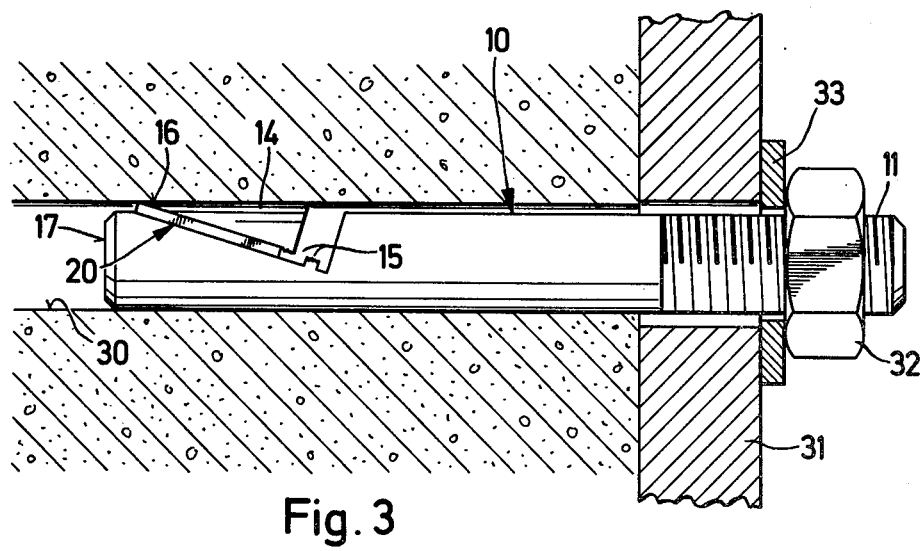
FIG. 3 is a side view of the expansion dowel illustrated in FIG. 1 in the anchored state within a borehole.

In FIG. 1 an expansion dowel assembly is shown including a dowel body 10. The dowel body is in the form of a stud, it has a leading end 17 and an opposite trailing end. As can be seen in FIG. 3, the leading end is the end inserted first into the borehole while the trailing end extends outwardly from the receiving material in which the borehole is formed. At its trailing end, dowel body 10 has a thread 11 formed on its side surface. When the dowel body 10 is inserted into a borehole, means screwed onto the thread 11 apply an axial tensional force or pulling action on the dowel body. Near the leading end of the dowel body, a transverse slot inclined slightly from a perpendicular to the dowel axis extends approximately halfway across the dowel body. Further, a second slot 13 is cut in the dowel body and extends in the longitudinal direction and at an acute angle to the dowel axis. The inner ends of the slots 12 and 13 are spaced closely from one another forming a web 15 between them which affords a predetermined breaking point. The slots 12, 13 form a substantially wedge-shaped expansion element 14 joined to the dowel body by the web 15. In addition, the slots 12 and 13 form two sides of a wedge-shaped recess in which the expansion element 14 is located. Adjacent the leading end 17 of the dowel body 10, the expansion element 14 forms a wedge-shaped tip 16. A plate-shaped separating element 20 is located in the longitudinally extending slot 13. The thickness of separating element 20 corresponds to that of the longitudinal slot 13 and, as a result, is retained in the slot automatically.

Figure 2:
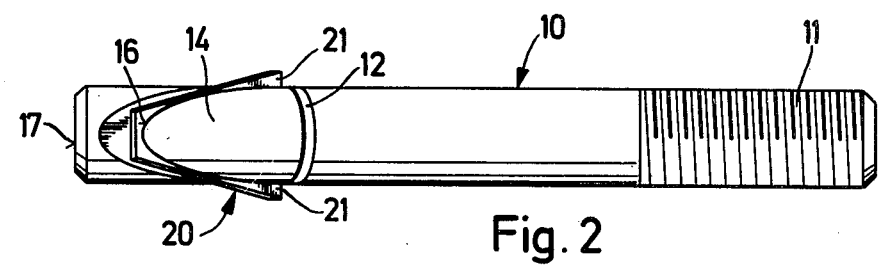
FIG. 2 is a view similar to FIG. 1, however, taken in the direction of the arrow A in FIG. 1.

In FIG. 2 the expansion dowel illustrated in FIG. 1 has been turned 90° so that the dowel is being viewed in the direction of the arrow A in FIG. 1. In this figure the separating member 20 has a trapezoidal form, that is, its end closer to the leading end 17 is much narrower than the opposite end. The opposite end of the separating element provides two projections 21 extending laterally outwardly from the side surface of the dowel body 10. As can be seen in FIG. 2, the projections extend outwardly to an increasing extent toward the trailing end of the dowel. When the expansion dowel is inserted into a borehole, such as is shown in FIG. 3, the projections 21 act as barbs which prevent dowel body 10 from turning about its longitudinal axis of from being pulled out of the borehole. Due to the resistance developed between the projections 21 and the surface of the borehole, the separating element 20 breaks the web 15 separating the expansion element 14 from the dowel body 10, as the dowel is driven into the borehole.

In FIG. 3 the expansion dowel as illustrated in FIG. 1 is in the anchored condition within a borehole 30. Expansion element 14 has separated from the dowel body 10 during either the insertion of the dowel or the tightening of the dowel due to the action of the separating member 20 on the web 15. As can be seen in this figure, the expansion element 14 has been displaced partially out of the recess defined in the dowel body by the transverse slot 12, the longitudinal slot 13 and the ruptured web 15. As an example of the use of the dowel, a plate 31 provided with an opening is placed over the trailing end of the dowel against the exterior surface of the receiving material in which the borehole 30 is formed. A hexagonal nut 32, screwed onto the thread 11 on the trailing end portion of the dowel body, presses the plate 31 against the receiving material over a washer 33 which distributes the pressing force. The expanding forces produced by the wedging action of the expanding element 14 and the dowel body 10 within the borehole 30 are proportional to the axial tension applied to the outer end of the dowel over the nut 32.

Figure 4:
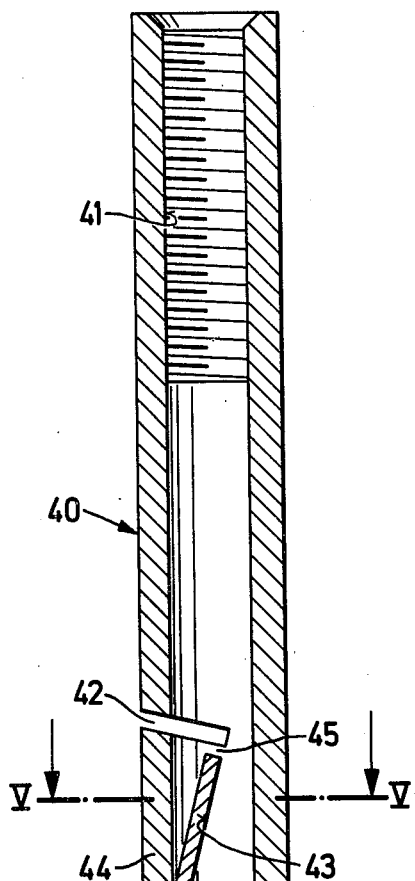
FIG. 4 is a longitudinal cross-sectional view of another embodiment of the expansion dowel incorporating the present invention with the dowel in the form of a threaded tubular member.

In FIG. 4 another embodiment of the expansion dowel incorporating the present invention is illustrated. In this embodiment, dowel body 40 is a tubular member having a leading end 47, note FIG. 6, and an oppositely directed trailing end. Within the bore in the tubular member of the dowel body 40, at the trailing end, is a female thread 41. In the leading end portion of the dowel body a transverse slot 42 is formed slightly inclined to a plane normal to the longitudinal axis of the tublar member and a longitudinal slot 43 is formed from the leading end 47 to a point close to the slot 42. The material of the tubular sleeve located between the adjacent ends of the slots 42, 43 forms a web 45 securing expansion element 44 to the remainder of the dowel body 40. Transverse slot 42 along with longitudinal slot 43 define two sides of a wedge-shaped recess in which the web-shaped expanding element 44 is positioned. Due to its shape, the expansion element 44 defines a wedge-shaped tip 46 pointing toward the leading end 47 of the dowel body.

The web 45 connecting the expansion element 44 to the dowel body 40 has a predetermined breaking point. When the web 45 is broken the expansion element 44 separates from the dowel body 40 and can move at least partly outwardly from the complementary wedge-shaped recess in the dowel body. As shown in FIG. 4, a separating member 50 is positioned within the longitudinal slot 43. Separating element 50 is in the form of a curved plate having a longitudinally extending leg 51 located within the slot 43 and a transverse leg 52 located across the leading end 47 of the dowel body 40. Longitudinal leg 51 is held within the longitudinal slot 43. The junction of the legs 51 and 52 extends outwardly beyond the leading end 47 of the dowel body.

Figure 5:
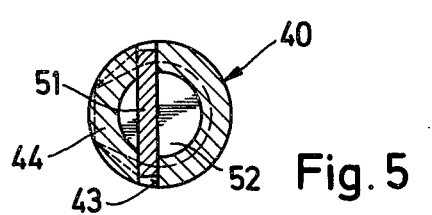
FIG. 5 is a cross-sectional view through the expansion dowel taken along the line V—V in FIG. 4.

In FIG. 5 a sectional view of the expansion dowel is shown taken along the line V—V in FIG. 4. The longitudinal leg 51 within the slot 43 is wider at its end more remote from the leading end 47 of the dowel body 40 and its sides converge inwardly toward the junction with the transverse leg 52. The transverse leg 52 is shaped to afford a cover substantially closing the leading end 47 of the dowel body and preventing borings and other materials within the borehole 60, note FIG. 6, from entering into the interior or bore within the tubular dowel body 40. As noted above, initially, the expansion element 44 is an integral part of dowel body 40 being connected to it by the web 45.

Figure 6:
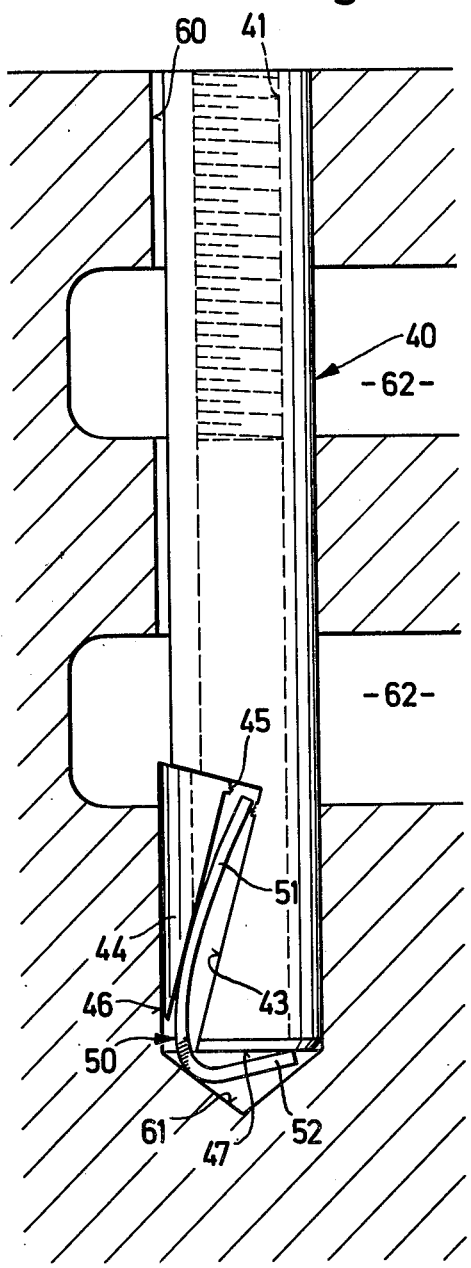
FIG. 6 is a side view of the expansion dowel shown in FIG. 4 anchored within a borehole.

In FIG. 6 the expansion dowel of FIG. 4 is shown inserted into and anchored within a borehole 60. In receiving material having one or more hollow spaces 62 extending transversely of the borehole 60 it is important to prevent premature separation of the expansion element 44 from the dowel body 40. Accordingly, the separating member 50 must not extend laterally outwardly from the outer surfaces of the dowel body. Longitudinal slot 43 opens through the leading end 47 of the dowel body. Accordingly, the separating member 50 extends generally in the axial direction from the longitudinal slot 43 in front of the leading end 47 of the dowel body 40. When transverse leg 52 reaches the inner end or base 61 of the borehole, any further driving-in of the dowel body causes the rearward end of the longitudinal leg 51 to break or shear the web 45 separating the expansion element 44 from the dowel body 40. Longitudinal leg 51 of separating member 50 is formed as a prestressed spring, note FIG. 6. Within the slot 43, the longitudinal leg adopts a planar configuration, however, after the web 45 is broken, longitudinal leg 52 assumes an arched shape and presses the expansion element 44 radially outwardly against the surface of the borehole 60. In other words, the expansion element 44 is displaced outwardly from the complementary shaped recess provided by the combination of the slots 42, 43 and the web 45. By applying an axially directed tension or pulling force on the dowel body, the dowel becomes wedged within the borehole. When a particular pulling force is reached, longitudinal leg 51 is again pressed flat due to the relative movement of the expansion element 44 and the dowel body 40. The transverse leg 52 of separating member 50 projecting forwardly of the leading end 47, effects a cover or closure of the bore in the tubular dowel body.

In addition to the dowels displayed in the drawing, each of which includes a single expanding element, it is advisable to provide the dowel body with several expanding elements, particularly for larger dimensions. Where multiple expanding elements are used, they can be arranged opposite one another or in a tandem arrangement.

While specific embodiments of the invention have been shown and described in detail to illustrate the application of the inventive principles, it will be understood that the invention may be embodied otherwise without departing from such principles.

What is claimed is:

1. An expansion dowel comprising an axially elongated dowel body and a wedge-shaped expanding element, said dowel body having a leading end arranged to be inserted first into a borehole, an opposite trailing end, and an outwardly facing side surface extending between said leading and trailing ends, means for producing axially directed forces in said dowel body located on the trailing end of said dowel body, said dowel body having a wedge-shaped recess opening outwardly from the side surface thereof and extending in the axial direction of said dowel body, said recess being enlarged in the direction toward the trailing end of said dowel body, said recess having a shape corresponding to the shape of said expanding element, said expanding element positioned in the wedge-shaped recess with the outwardly facing surface of said expanding element forming a continuation of the outwardly facing side surface of said dowel body, said expanding element having a wedge-shaped tip located closer to the leading end of said dowel body, wherein the improvement comprises that a web interconnects said wedge-shaped expanding element and said dowel body, said web having a predetermined breaking point permitting separation of said expanding element from said dowel body, and a separating member positioned between said dowel body and said expanding element and arranged to break said web separating said expanding element from said dowel body when said expansion dowel is inserted into a borehole, said web being located at the opposite end of said recess from the wedge-shaped tip of said expanding element in the axial direction of said dowel body, and said separating member having at least a portion thereof located between said expanding element and said dowel body and said portion having a flat plate-like shape.

2. An expansion dowel, as set forth in claim 1, wherein said separating member projects laterally outwardly from the side surface of said dowel body.

3. An expansion dowel, as set forth in claim 2, wherein said separating member projects outwardly from said dowel body to an increasing extent in the direction toward the trailing end of said dowel body.

4. An expansion dowel, as set forth in claim 1, wherein a second portion of said separating member connected to said portion located between said expanding element and said dowel body extends forwardly from the leading end of said dowel body.

5. An expansion dowel, as set forth in claim 4, wherein said portion of said separating member located between said expanding element and said dowel body comprises a prestressed spring.

6. An expansion dowel, as set forth in claim 4, wherein said second portion of said separating member extends transversely across the leading end of said dowel body.

7. An expansion dowel, as set forth in claim 1, wherein said dowel body comprises a stud with a portion of the side surface thereof being threaded from the trailing end.

8. An expansion dowel, as set forth in claim 1, wherein said dowel body comprises a tubular member having a thread formed in the inner surface thereof from the trailing end.

9. An expansion dowel, as set forth in claim 1, wherein said recess in said dowel body being defined by a first slot extending generally in the axial direction of said dowel body and formed in said body from a location adjacent the leading end thereof and extending inwardly into said dowel body toward the trailing end thereof at an acute angle to the axis of said dowel body, and a second slot extending generally transversely of the axial direction of said dowel body and extending inwardly from the side surface thereof to a location intersecting the projection of said first slot, and said web being located at the trailing end of said first slot and separating said first slot from said second slot.

10. An expansion dowel, as set forth in claim 1, wherein said at least a portion of said separating member has a width increasing from its end closer to the leading end of said dowel body toward the trailing end thereof.

11. An expansion dowel, as set forth in claim 1, wherein said web is formed integrally with said dowel body and said expanding element.

* * * * *